United States Patent [19]
Koskinen

[11] Patent Number: 6,000,518
[45] Date of Patent: Dec. 14, 1999

[54] CLUTCH TRANSMITTING ROTATING MOTION

[76] Inventor: Kauko Koskinen, Lintukallionkuja 2, Fin-33680 Tampere, Finland

[21] Appl. No.: 09/043,654
[22] PCT Filed: Sep. 27, 1995
[86] PCT No.: PCT/FI95/00529
§ 371 Date: Mar. 25, 1998
§ 102(e) Date: Mar. 25, 1998
[87] PCT Pub. No.: WO97/12159
PCT Pub. Date: Apr. 3, 1997
[51] Int. Cl.[6] .................................................. F16D 25/0635
[52] U.S. Cl. .......................................... 192/86; 192/85 AA
[58] Field of Search .................................. 192/85 AA, 86, 192/70.11

[56] References Cited

U.S. PATENT DOCUMENTS

| | | |
|---|---|---|
| 2,945,574 | 7/1960 | Plume . |
| 3,202,018 | 8/1965 | Hilpert ............................ 192/85 AA X |
| 3,324,983 | 6/1967 | Snoy et al. . |
| 3,373,853 | 3/1968 | Aschauer . |
| 3,924,717 | 12/1975 | Ookubo et al. . |
| 4,223,774 | 9/1980 | Sommer ..................................... 192/86 |

FOREIGN PATENT DOCUMENTS

| | | |
|---|---|---|
| 832856 | 4/1960 | United Kingdom . |
| 848823 | 9/1960 | United Kingdom . |

*Primary Examiner*—Richard M. Lorence
*Attorney, Agent, or Firm*—Larson & Taylor

[57] ABSTRACT

A clutch for transmitting rotating motion includes a clutch body, ring flanges positioned an exterior of the clutch body, a belt pulley positioned between the ring flanges and a hydraulic arrangement for producing axial motion and an axial force, causing the belt pulley to be pressed between the ring flanges to transmit rotating motion to the belt pulley. The hydraulic arrangement includes a slight leakage of the hydraulic medium out of the pressurized chamber space to which oil is supplied for engaging clutching, thereby allowing for rapid disengagement of the clutch and circulation of pressurized oil.

4 Claims, 3 Drawing Sheets

CLUTCH TRANSMITTING ROTATING MOTION

FIELD OF THE INVENTION

The present invention is directed to a medium actuated clutch in which a slight leakage of hydraulic medium is arranged out of a pressurized chamber space to allow rapid disengagement of the clutch and circulation of pressurized oil.

BACKGROUND OF THE INVENTION

Previously known from U.S. Published Patent Application No. B382,290 is a medium actuated clutch where the rotation-transmitting clutch disc and a mobile pressure plate are in a chamber containing the medium. The chamber is divided into many sub-chambers by the disc and the plate and by means of pressure variations, the pressure plate can be put into motion and the disc and plate surfaces in abutment against each other to carry out clutching.

Such a clutch is applicable to cars with automatic transmission with the clutch thereby in the gearbox. In the gearbox there is oil to operate the clutch and possible oil leakage is of no harm if the leaking oil is flowing directly back into the gearbox. However, a clutch of this kind is not very well fitted for general cases, for instance as a common shaft clutch and, of course, not as a dry clutch in vehicles.

SUMMARY OF THE INVENTION

A clutch as per this invention offers a new disc clutch assembly.

The most significant advantages of the invention can be considered that the thrust bearing can be omitted. It is not needed either with the clutch engaged or disengaged, since the disc shaft needs no support against axial forces. The clutch works with medium of low pressure and shaft packings are needed only to prevent leakage of low pressure medium leaving the clutch, lower than working pressure. The clutch body still rotates all the time along with the shaft and the packings are not exposed to wear and tear. The clutch is interconnected with a combustion engine such that driving oil can be conveyed from the lubricating oil pump, and the return oil is easily conveyed along the clutch shaft to the crankshaft and the crankcase.

BRIEF DESCRIPTION OF THE DRAWINGS

In the following the invention is disclosed with reference the enclosed drawing, where.

DETAILED DESCRIPTION OF THE PREFERRED EMBODIMENTS

Figure 1:
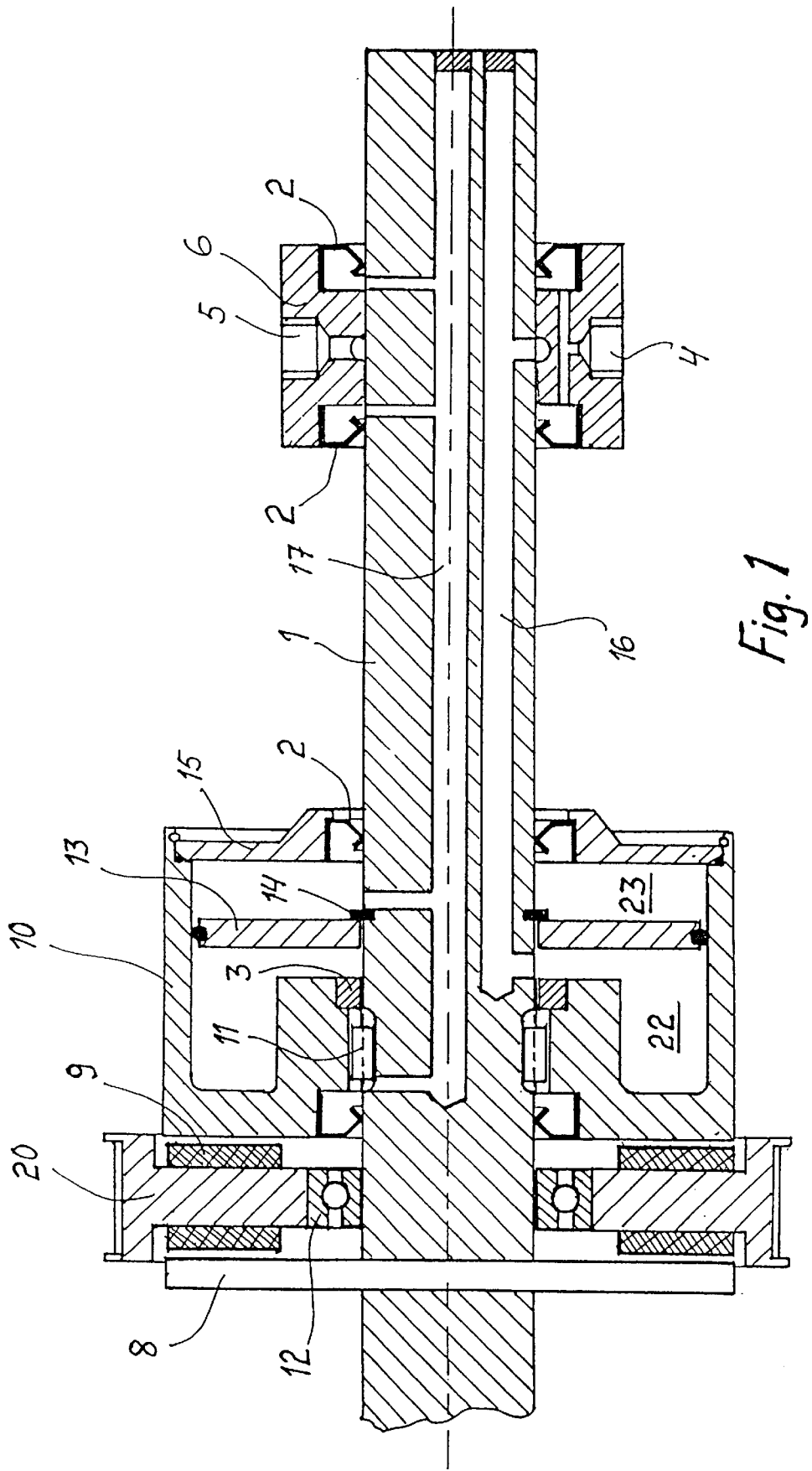
FIG. 1 is a cross-sectional side view of the clutch.

In FIG. 1 the clutch shaft 1 is shown as an actuating shaft from which the rotating motion is transmitted by means of the clutch to belt pulley 20. The belt pulley 20 is fastened with bearings to rotate with respect to the shaft 1 by means of a ball bearing 12. The belt pulley 20 has clutch linings 9 on both power transmitting sides. On engaging the clutch, the belt pulley is pressed between flange 8 and body 10 for power transmission to the belt pulley. Clutch body 10 built about shaft 1 contains a cylindrical inner chamber, which is divided into two chambers by a disc 13 in the cylinder. Disc 13 is secured to the shaft surface so that it cannot slide, at least not past holder 14. The clutch body rotates always along with shaft 1. This is arranged by rolls 11 in the shaft splines, which have semi-splines in the the clutch body 10. Shaft 1 and clutch body 10 are interconnected by a bronze ring 3, which has a sliding fit with regard to shaft 1. One end of clutch body 10 can be opened and fitted with a shaft packing 2.

Channels are drilled in shaft 1 for the medium, for instance 16 and return oil 17. Pressurized oil is conveyed to chamber 22 and chamber 23 and the adjacent areas of shaft packing 2 are connected to return channel 17. Shaft channels 16 and 17 are connected to a connection piece 6 arranged about shaft 1 and furnished with connections 4 and 5 for both channels.

To engage the clutch the pressure is steered to channel 16 and further to chamber 22. Since due to holder 14 disc 13 cannot move, body 10 moves towards the belt pulley and due to pressure in chamber 22 the body remains in position pressing the belt pulley 20 against flange 8 in order to sustain the connection. Belt pulley 20 begins to rotate along with the shaft and the body. The pressure of chamber 23 is low because of the free discharge channel 17,4. Due to rotation of chambers 22,23 dynamic pressure is produced into both chambers as a function of rotative velocity, when the chambers are filled with oil, but this pressure does not tend to move the body portion 10 in the form of the embodiment shown in the figure when both chambers have same rate heavy oil. With the clutch engaged possible oil leaks reaching as far as the shaft packings are conveyed to channel 17 and connection 4. In this case the clutch does not generate any axial force and accordingly no thrust bearing is needed.

Upon engaging the clutch the access of pressure and oil into channel 16 is closed. Since the medium is not compressible, the compressive force decreases immediately and the body 10 moves slightly off belt pulley 20 and the clutch declutches. Even in this case no axial force remains active in the shaft.

Figure 2:
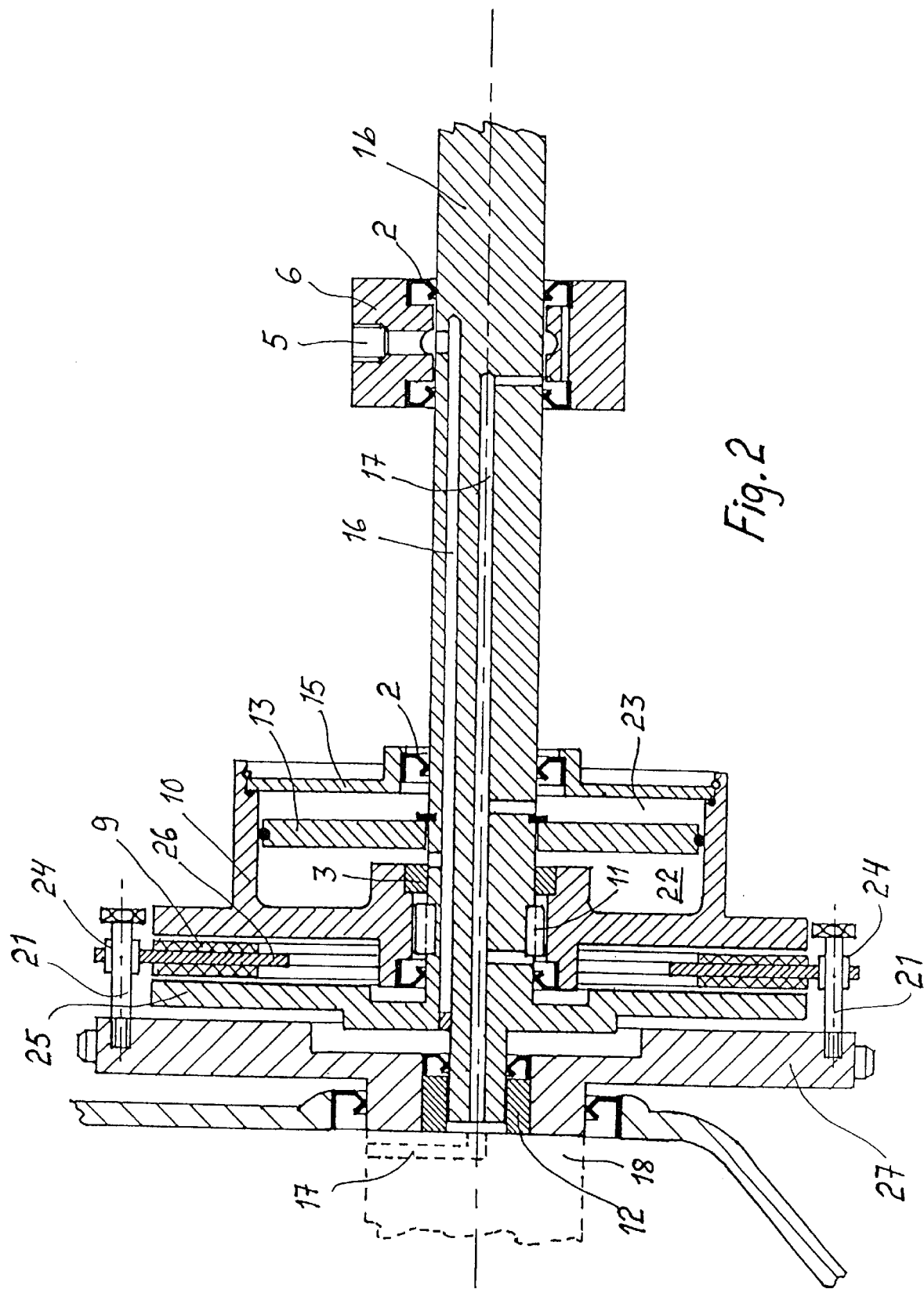
FIG. 2 is a cross-sectional side view of another clutch.

FIG. 2 shows a vehicle clutch whose driving part is a clutch disc 26 fixed to flywheel 27 slidingly on screws 21. Clutch disc 26 has clutch linings 9. About screws 21 there are sliding sleeves 24. Shaft 1b having a flange 25 is working as the driven part. In the embodiment as per FIG. 2 an optional track for the oil through a bore to the crankcase 18 is illustrated. From its other end shaft 1b is fastened to flywheel 27 center by a bearing 12. Otherwise the clutch is similar to the clutch in FIG. 1.

Due to the clutch function, the construction of its valve is of significance, by means of which valve the pressure to and from chamber 22, especially in vehicle use, is adjusted. It must be possible to slide the clutch with the valve. In the valve a position must be easily found, where by certain oil pressure rate almost as much oil flows into chamber 22 as out from it in order to reach an intermediate sliding position for the clutch. Such spool valves are available.

In order to activate disengagement of the clutch, dynamic pressure can be utilized, which is formed in chambers 22,23 when the clutch is rotating. It is possible to make at pressure plate 13 a shoulder in shaft 1b, where the shaft diameter gets smaller towards end 15 and further on. Then the cross-sectional area of chamber 23 becomes greater than that of chamber 22 and immediately, when pressure channel 16 is closed, a greater force is produced from dynamic pressure in chamber 23 than in chamber 22 and the dynamic pressure tends to move body 10 loose and intensifies the disengagement. Naturally, it is also possible to put in chamber 23 a spring pressed to make the chamber 23 larger, the effect of which spring is clearly exceeded by the effect of chamber 22 pressure. The spring would accelerate disengagement of clutch.

Several clutch discs can be abreast pressed by the same body portion and an advantageous embodiment is also that several clutches are arranged on the same shaft 1 and for each of them an individual drive wheel, for instance a belt pulley, and by control of working pressure the required clutch 1 and belt pulley of shaft are selected to pull. Then power transmissions can be formed in using belt pulleys of different size and by means of the clutch one of them is chosen to pull while the other belt pulley clutches are steered into disengaged position.

Figure 3:
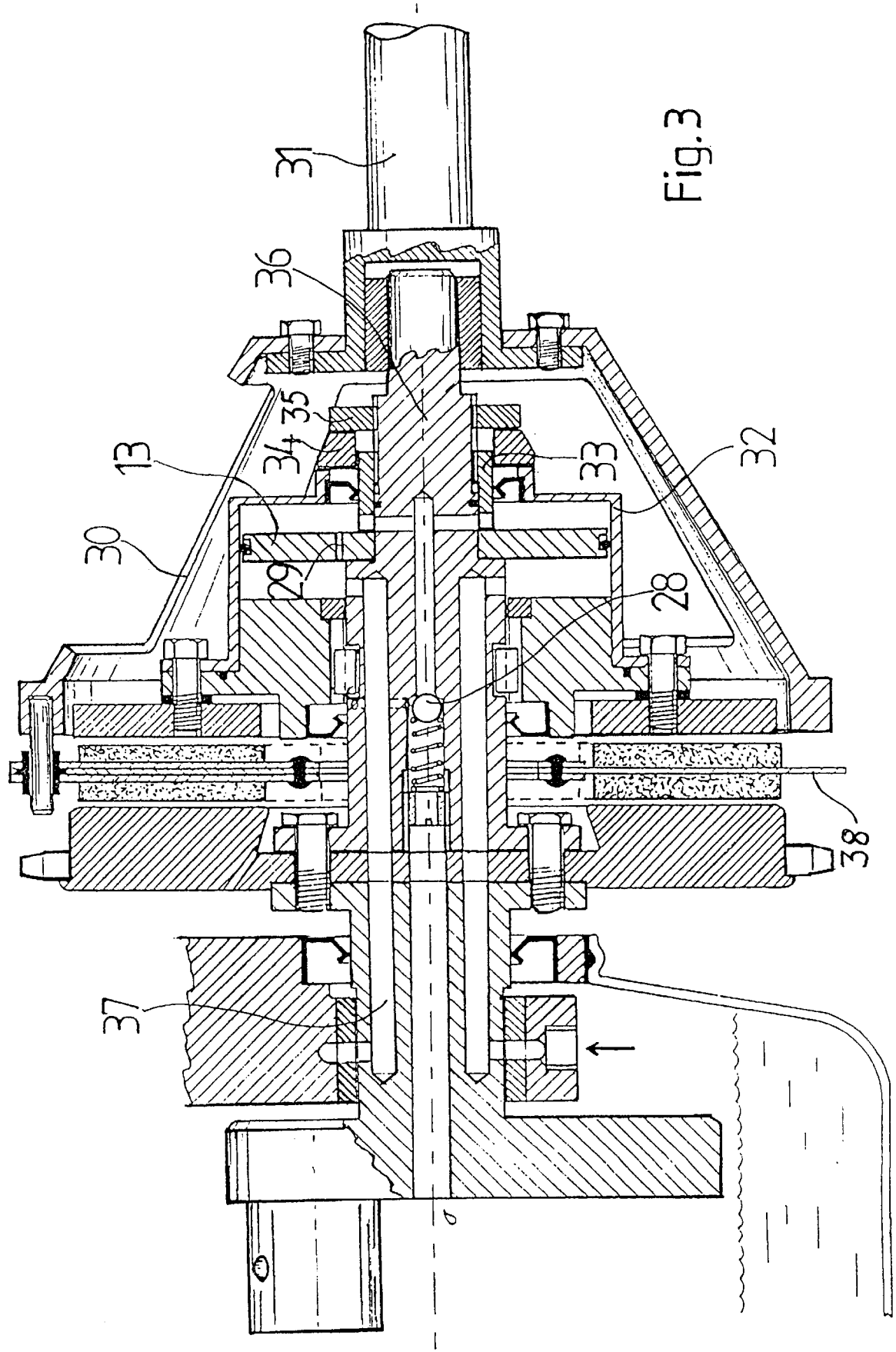
FIG. 3 is a cross-sectional view of a clutch interconnected with a combustion engine.

FIG. 3 shows a clutch as per the invention interconnected with a combustion engine. The clutch disc includes a flange 38 with clutch lining pressed against the flywheel in the crankshaft end by a ring flange fixed to moving clutch body 32. From clutch disc 38 the rotating motion is transmitted by means of a conical box 30 to a secondary shaft 31. The clutch shaft is an extension of the crankshaft. On the clutch shaft surface the clutch body 32 glides by means of oil pressure. Hydraulic oil is conveyed along channel 37 into the cylinder chamber to the left hand side of piston 13. Oil pressure moves the clutch into disengaged position in moving the body 32. The clutch is disengaged by lack of pressure. In the embodiment there can be continuous slight oil leakage from piston 13 mouth 29 to the return side. With this embodiment rapid disengagment of the clutch is achieved as soon as the feed of oil pressure side is cut off. Further, with oil circulation other advantages are achieved, such as prevention of oil warming-up or foaming in the cylinder chamber.

There is in the oil return channel a ball valve 28 disengaging by low pressure, for instance 0.5 bar. This prevents the cylinder chambers from getting empty on stopping the engine. Since the chambers on both sides of piston 13 are always filled with oil, the clutch is applicable as soon as the engine is started.

In FIG. 3 piston 13 is locked on shaft 36 between the shoulder and sleeve 33. With the adjustment ring 34 the position of body 32 can be regulated to the left for instance according to the wear of the clutch lining. Ring 34 is fixed by a thread on sleeve 33 surface. With ring 35 the adjustment is secured on tightening ring 35 against ring 34 by means of a thread on shaft 36 surface.

The clutch is disengaged also by high rotations when the feed pressure is disconnected, since the piston has a greater area towards the right-hand chamber and only the centrifugal force on the oil then produces the pressure into the chambers. Thus, the clutch is disengaged by the impact of pressure.

I claim:

1. A clutch positionable around a shaft for transmitting rotating motion comprising:

a clutch body;

ring flanges positioned on an exterior of the clutch body;

a belt pulley positioned between said ring flanges; and a hydraulic arrangement for producing axial motion and axial force for pressing said belt pulley between said ring flanges for transmitting rotating motion to said belt pulley in order to carry out clutching, the clutch body acting as a cylinder for the hydraulic arrangement and producing axial motion by means of pressurized hydraulic medium gliding on the shaft for engaging and disengaging clutching, said hydraulic arrangement including a pressurized chamber space into which said pressurized hydraulic oil is supplied for engaging clutching, a slight leakage of hydraulic medium being arranged out of said chamber space for allowing rapid disengagement of the clutch and circulation of pressurized oil.

2. A clutch according to claim 1 wherein said leakage of hydraulic medium is arranged over a piston through a throttle hole in the piston.

3. A clutch according to claim 1 wherein said leakage of hydraulic medium is arranged out of the pressurized chamber space from between the shaft and a slide ring to a return chamber for the medium.

4. A clutch according to claim 1 wherein shaft includes channels formed therein for conveyance of the pressurized medium inside the shaft to the pressurized chamber space and for conveyance of said medium and said leakage to a return chamber.

* * * * *